(12) United States Patent
Niimi

(10) Patent No.: US 6,850,009 B2
(45) Date of Patent: *Feb. 1, 2005

(54) JOINED BODY AND HIGH PRESSURE DISCHARGE LAMP

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/727,852

(22) Filed: Dec. 4, 2003

(65) Prior Publication Data

US 2004/0119392 A1 Jun. 24, 2004

Related U.S. Application Data

(62) Division of application No. 09/631,419, filed on Aug. 3, 2000, now Pat. No. 6,703,136.

(30) Foreign Application Priority Data

Jul. 3, 2000 (JP) .......................... 2000-200536

(51) Int. Cl.$^7$ .......................... H01J 17/18; H01J 61/36
(52) U.S. Cl. ........................................ 313/623; 624/625
(58) Field of Search ........................ 313/623–625; 445/22, 23, 26

(56) References Cited

U.S. PATENT DOCUMENTS

| | | | |
|---|---|---|---|
| 4,310,773 A | 1/1982 | Zukowski et al. |
| 4,353,623 A | 10/1982 | Maier |
| 5,424,608 A | 6/1995 | Juengst et al. |
| 6,103,397 A | 8/2000 | Sugimoto et al. |

FOREIGN PATENT DOCUMENTS

| | | |
|---|---|---|
| EP | 0 452 275 | 10/1991 |
| EP | 0 726 238 | 8/1996 |
| EP | 0 751 549 A1 | 1/1997 |
| EP | 0 982 278 A1 | 3/2000 |
| HU | 220 173 B | 3/1998 |
| JP | 53-33209 | 3/1978 |
| JP | 55-042228 | 3/1980 |
| JP | 58-204880 A | 11/1983 |
| JP | 59-152275 A | 8/1984 |
| JP | 60-231472 | 11/1985 |
| JP | 61-003809 | 1/1986 |
| JP | 61-201676 A | 9/1986 |
| JP | 62-56380 A | 3/1987 |
| JP | 1-099775 A | 4/1989 |
| JP | 01-212283 | 8/1989 |
| JP | 1-236573 A | 9/1989 |

(List continued on next page.)

OTHER PUBLICATIONS

*Patent Abstracts of Japan*, vol. 2000, No. 21, Aug. 3, 2001 (JP 2001 110340).

*Patent Abstracts of Japan*, vol. 2000, No. 20, Jul. 10, 2001 (JP 2001 076678).

*Primary Examiner*—Joseph Williams
*Assistant Examiner*—Anthony Perry
(74) *Attorney, Agent, or Firm*—Burr & Brown

(57) ABSTRACT

A high pressure discharge lamp including a ceramic discharge tube defining an inner space and having an opening formed within an end portion thereof, an electrode system provided within the inner space, a sealing member including a ceramic or a cermet with a through hole formed therein, at least a part of the sealing member being fixed within the opening of the ceramic discharge tube, and a metal member. A joining portion is interposed between the metal and sealing members, and includes a main phase contacting the metal member and an intermediate ceramic layer contacting the sealing member and existing between the sealing member and the main phase. The main phase includes a porous bone structure with open pores, is made of a sintered product of metal powder, and includes a ceramic phase impregnated into the open pores thereof.

32 Claims, 14 Drawing Sheets

FOREIGN PATENT DOCUMENTS

| | | |
|---|---|---|
| JP | 1-236575 A | 9/1989 |
| JP | 03-103369 | 4/1991 |
| JP | 5-94945 | 12/1993 |
| JP | 06-126472 | 5/1994 |
| JP | 07-053278 | 2/1995 |
| JP | 07-247188 | 9/1995 |
| JP | 8-253373 A | 10/1996 |
| JP | 8-273616 A | 10/1996 |

FIG. 6
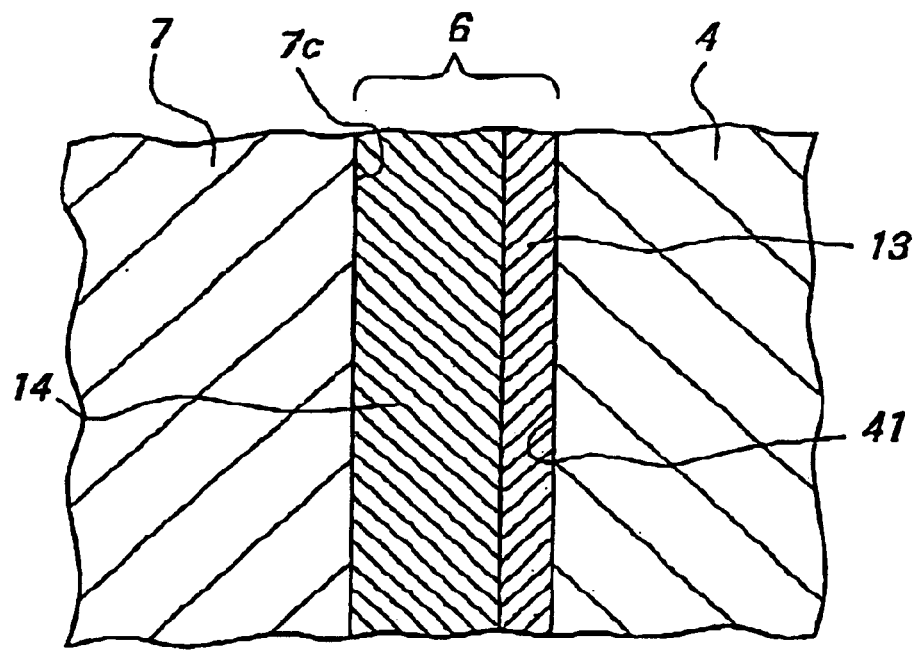
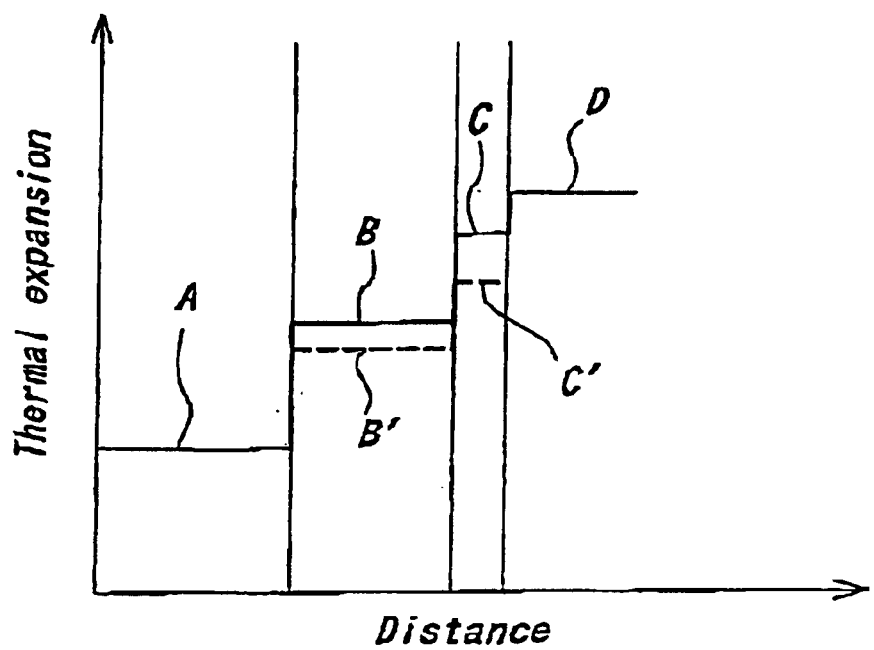

JOINED BODY AND HIGH PRESSURE DISCHARGE LAMP

CROSS REFERENCE TO RELATED APPLICATION

This application is a division of U.S. application Ser. No. 09/631,419 filed Aug. 3, 2000 now U.S. Pat. No. 6,703,136, the entirety of which is incorporated herein by reference.

BACKGROUND OF THE INVENTION

1. Field of the Invention

The present invention relates to a joined body, particularly to a high pressure discharge lamp using a ceramic discharge tube.

2. Description of the Related Art

A high pressure discharge lamp has a ceramic discharge tube with two end portions, in which sealing members (usually referred to as a ceramic plug) are inserted, respectively, to seal the respective end portions. A through hole is formed in each sealing member and a metal member, to which a predetermined electrode system is attached, is inserted within the through hole. An ionizable light-emitting material is introduced and sealed within the inner space of the discharge tube. Known high pressure discharge lamps include a high pressure sodium vapor and metal halide lamps, the latter exhibiting more superior color coordination. The lamp may be used in high temperature condition by forming the discharge tube by a ceramic material.

In such discharge lamp, it is necessary to air-tightly seal between the end portion of the ceramic discharge tube and a member for supporting an electrode system. The ceramic discharge tube has a main body with a shape of a tube with two narrow ends, or a barrel, or a straight tube. The ceramic discharge tube is made of, for example, alumina sintered body.

The specification of Japanese Patent Application No. 178,415/1999 (EPO EP0982278, A1) discloses the following structure. The joining portion between the end portion of a ceramic discharge tube and a member for supporting an electrode system comprises main phase contacting the discharge tube, and an intermediate ceramic layer contacting the supporting member and existing between the supporting member and the main phase. The main phase is composed of a porous bone structure, with open pores and made of a sintered product of metal powder, and ceramic phase impregnated into the open pores in the porous bone structure. Herewith, such a joined structure has improved air-tightness and resistance to corrosion, and repeated thermal cycles do not result in the fracture of the joined structure.

SUMMARY OF THE INVENTION

The inventor further examined the above sealing structure and, therefore, achieved a joined structure having resistance to fatigue and fracture, even when the structure is subjected to repeated thermal cycles between a high temperature, for example 1000° C. or higher, and room temperature.

That is, it is an object of the invention to provide a joined structure having resistance to fatigue and fracture, even when the structure is subjected to repeated thermal cycles between a high temperature, for example 1000° C. or higher, and room temperature.

It is another object of the invention to apply such a joined structure to a high pressure discharge lamp, for improving the resistance to a corrosive gas, such as a metal halide, and the air-tightness and for avoiding the fracture of the joined structure due to repeated cycles of activation and deactivation.

The present invention provides a joined body of a first member made of a metal and a second member made of a ceramic or a cermet. The joined body comprises a joining portion interposed between the first member and the second member for joining the first and second members, wherein the joining portion comprises main phase contacting the first member and an intermediate ceramic layer contacting the second member and existing between the second member and the main phase. The main phase is composed of a porous bone structure, made of a sintered product of metal powder and with open pores, and ceramic phase impregnated into the open pores in the porous bone structure.

The present invention further provides a ceramic discharge lamp comprising: a ceramic discharge tube with an inner space formed therein and end portions, the inner space being filled with an ionizable light-emitting material and a starter gas and an opening being formed within the end portion; an electrode system provided within the inner space; a sealing member with a through hole formed therein, a part of the sealing member being fixed within the opening of the ceramic discharge tube; and a metal member; wherein the metal member and the sealing member constitute the above air-tight joined body. The metal member is the first member and the sealing member is the second member.

The present invention further provides a ceramic discharge lamp comprising: a ceramic discharge tube with an inner space formed therein and end portions, the inner space being filled with an ionizable light-emitting material and a starter gas and an opening being formed within the end portion; an electrode system provided within the inner space; and a metal member; wherein the metal member and the ceramic discharge tube constitute the above air-tight joined body. The metal member is the first member and the ceramic discharge tube is the second member.

The present invention provides a joined structure of a first member made of a metal, such as molybdenum, and a second member made of a ceramic or a cermet, in which the members may be joined with a high strength, the joined structure has improved air-tightness and resistance to corrosion, and repeated thermal cycles do not result in the fracture of the joined structure. The invention provides a method for manufacturing the same.

BRIEF DESCRIPTION OF THE DRAWINGS

FIG. 6 is a diagram schematically showing a layered structure of the joining portion of the joined body of FIG. 1(b) and the thermal coefficients of the layers.

FIG. 11 is a cross sectional view schematically showing an embodiment of an end portion of a high pressure discharge lamp according to the invention, wherein a metal member 7 is joined to an end portion 1a of a discharge tube 1 and a metal element 7 and a metal axis of an electrode system 27 is electrically connected by a metallized layer 32, covering the surface of the end portion 1a.

DETAILED DESCRIPTION OF THE INVENTION

Figure 1A:
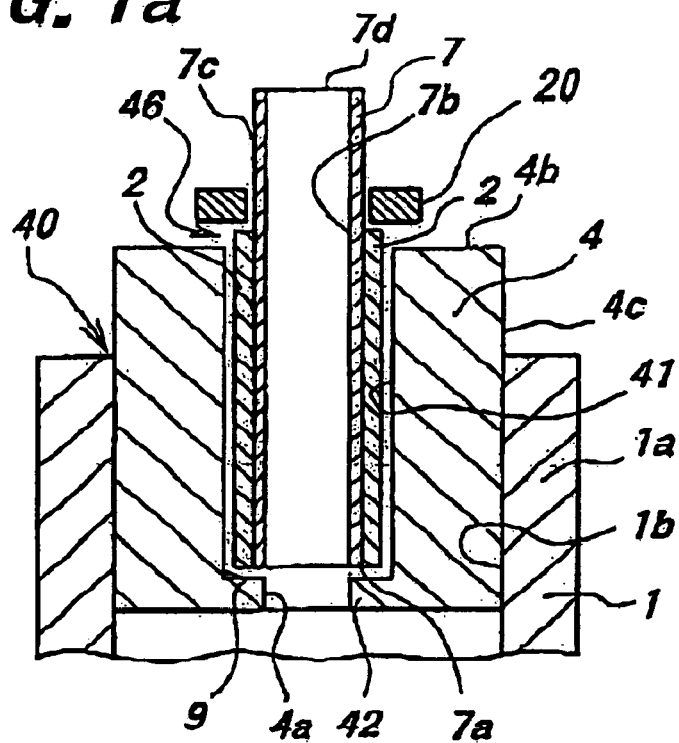
FIG. 1(a) is a cross sectional view schematically showing the state wherein a porous bone structure 2 is provided between a sealing member 4 and a metal member 7.

FIGS. 1(a), 1(b) and 2–6 are cross sectional views showing an end portion of a high pressure discharge lamp of the invention.

An inner wall surface 1b of an end portion 1a of a ceramic high pressure discharge tube 1 is formed so as to extend straightforwardly in the direction of the central axis of the tube. A part of a sealing member 4 is inserted within an opening 40 of the end portion 1a. 4c is an outer surface and 46 is a through hole of the sealing member 4.

A depression or hollow 9 is formed on the inner wall surface 4a of the sealing member 4. A metal member 7 is held in the hollow 9. In the embodiment, the metal member 7 has a shape of a tube and an opening is formed in its end portion 7d, the opening being sealed after introducing a starter gas and an ionizable light-emitting substance. 7b is an inner surface and 7c is an outer surface of the metal member 7. An inner space of the metal member 7 is commuted with an inner space of the ceramic discharge tube 1 (described below). A protrusion 42 is provided in the sealing member 4 and faces an end portion 7a of the metal member 7.

As shown in FIG. 1(a), the inventor provided a porous bone structure 2, made of a sintered product of metal powder and with open pores, between the metal member 7 and sealing member 4. A ceramic material ring 20 was then positioned on the bone structure 2. The melting point of the bone structure 2 is adjusted so as to exceed that of the ceramic material.

Figure 1B:
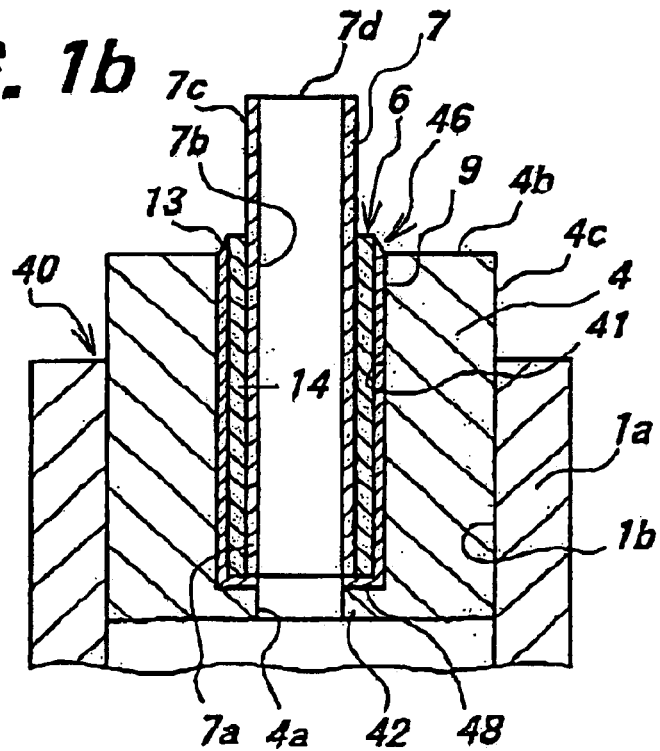
FIG. 1(b) is a cross sectional view schematically showing a joined body.

When the ceramic material was melted, as schematically shown in FIG. 1(b), the inventor found that the melted material was impregnated into the open pores to form main phase 14, comprising the porous bone structure having a ceramic phase impregnated into the open pores. The inventor further found that the thus melted material flows between the sealing member 4 and the main phase 14 so that the bone structure is slightly separated from the surface of the sealing member 4 to form the intermediate ceramic layer 13. The main phase 14 and intermediate ceramic layer 13 together form a joining portion 6 joining the metal member 7 and sealing member 4. 41 is a joint interface of the sealing member 4. The joining portion 6 extends to the region near the protrusion 42. A joining ceramic layer 48 is formed between the protrusion 42 and the end portion 7a of the metal member 7.

Figure 2:
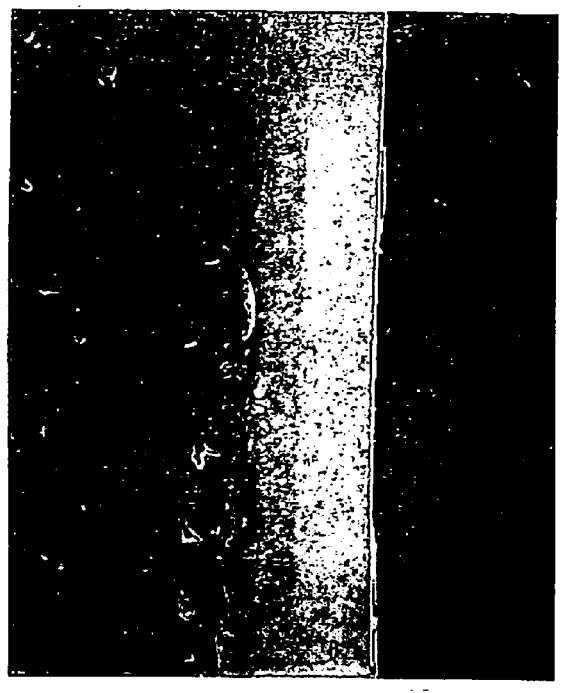
FIG. 2 is an SEM photomicrograph showing the joint interface between a metal member and a sealing member.
Figure 3:
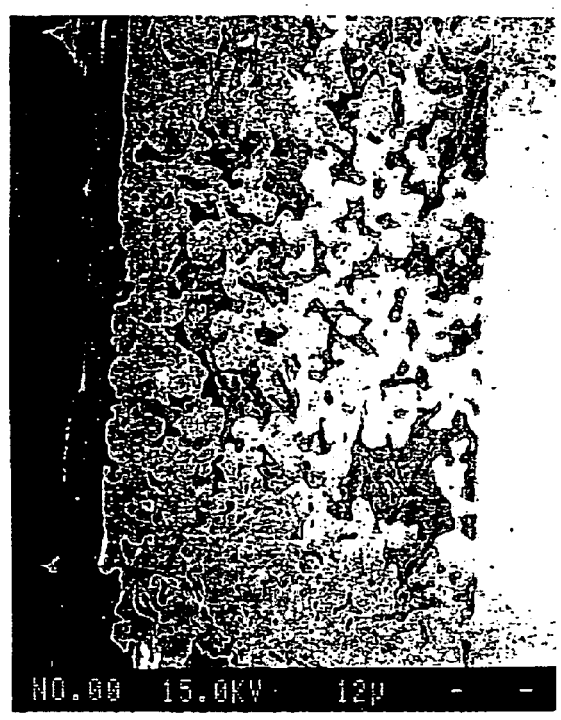
FIG. 3 is a photomicrograph showing an enlarged view of a part of FIG. 2.
Figure 4:
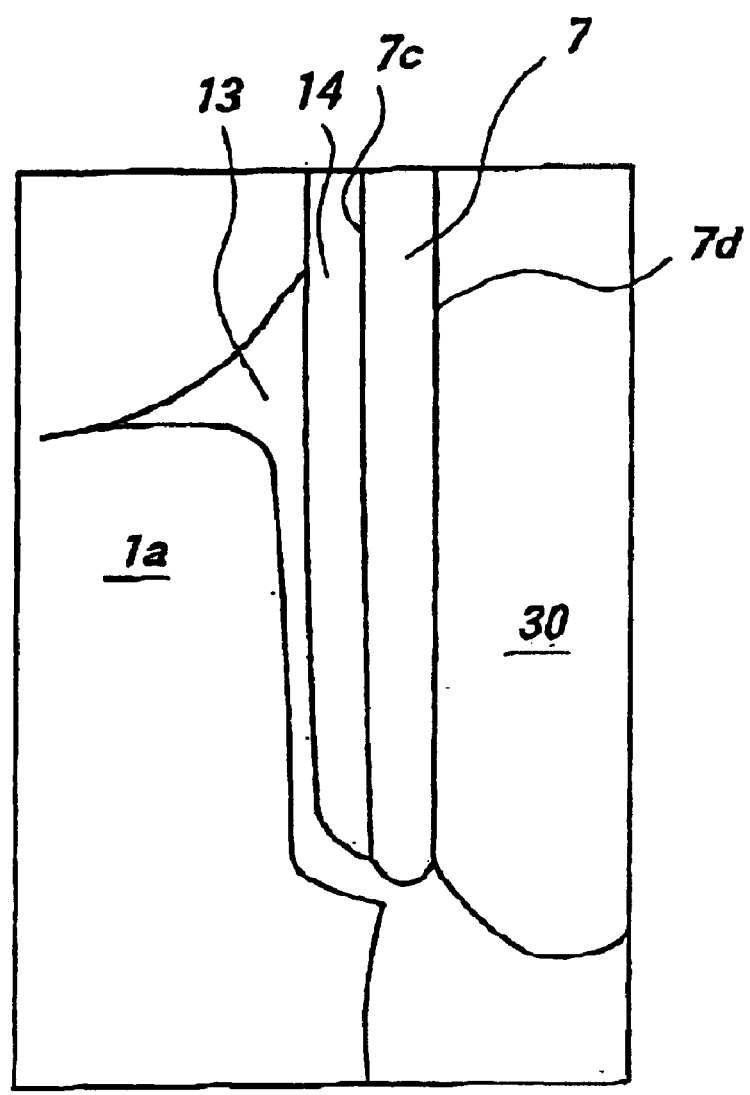
FIG. 4 is a diagram illustrating the photomicrograph of FIG. 2.
Figure 5:
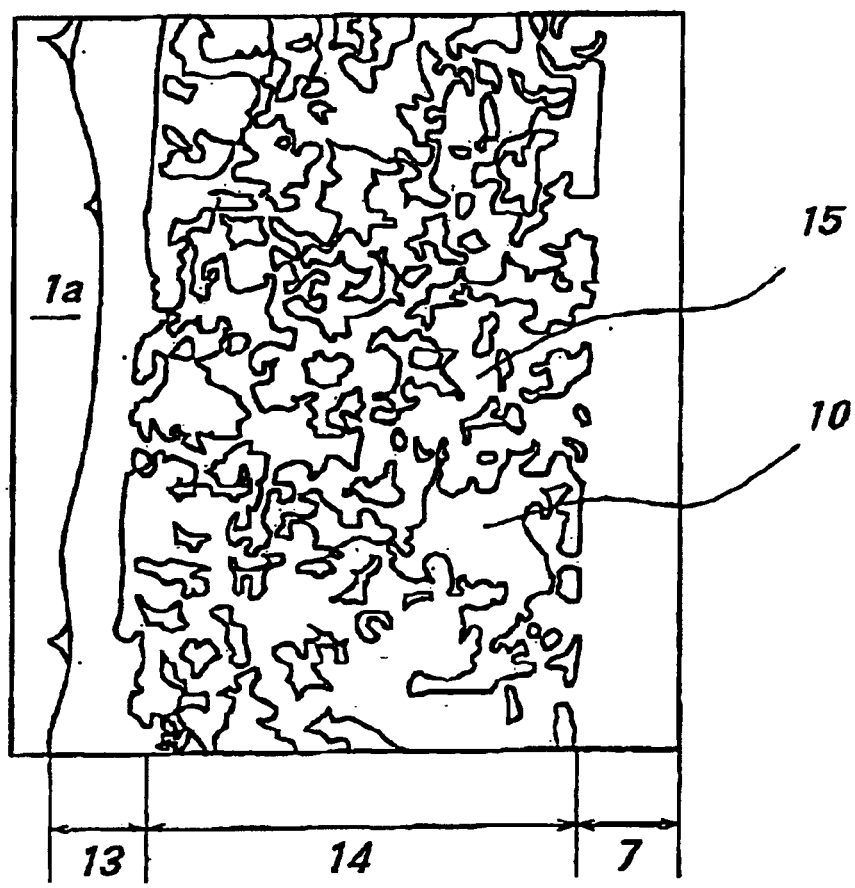
FIG. 5 is a diagram illustrating the photomicrograph of FIG. 3.

Such structure will be explained referring to the scanning electron microscope photomicrographs of FIGS. 2 and 3, and line diagrams of FIGS. 4 and 5. FIG. 2 is a photomicrograph showing the region near the interface between the metal member 7 and the sealing member 4, and FIG. 4 is a diagram illustrating the photomicrograph of FIG. 2. FIG. 3 is an enlarged view showing the photomicrograph of FIG. 2, and FIG. 5 is a diagram illustrating the photomicrograph of FIG. 3.

The intermediate ceramic layer 13 and main phase 14 is formed on the surface of the sealing member 4. The main phase 14 is composed of the bone structure 15 and the ceramic phase 10 impregnated into open pores of the bone structure 15. The intermediate ceramic layer 13 is composed of the same composition as the impregnated ceramic phase 10. The main phase 14 of the joining portion 6 is formed on the surface of the metal member 7. In the photomicrograph of FIG. 3, the whitish region in the main phase 14 is metallic molybdenum, and gray or black region in the main phase 14 is the impregnated ceramic phase. The difference of the brightness in the impregnated ceramic phase shows that the ratio of the components in the ceramic, such as alumina, has been changed microscopically.

In the joined body having the above structure, tensile stresses on the ceramic are dispersed by means of metal particles (porous bone structure) and compression stress on the bone structure is dispersed by means of the ceramic impregnated into its open pores. That is, the different kinds of materials may cooperate with each other to cope with both of the tensile and compression stresses on the joining portion. Further, it is relatively hard to generate cracks in the ceramic materials. In addition, when cracks develop within the ceramic phases, such cracks may be interrupted by the porous bone structure made of a metal, thereby preventing the fracture of the joining portion. Further, such a main phase comprising the porous bone structure and impregnated ceramic phase adheres to the metal member and the intermediate ceramic layer strongly adheres to the sealing member.

Further, ceramic components susceptible to corrosion are mainly impregnated into the open pores of the bone structure.

Further, the joined phase of the present invention has an extremely high relaxing effect of the difference of the thermal expansion coefficients of the metal and ceramic. That is, as shown in the schematic diagram of FIG. 6, when a sealing member 4 has a thermal expansion coefficient D larger than that coefficient A of a metal member 7, a thermal coefficient B of the main phase 14 containing both metal and ceramic is greater than A. Since an intermediate ceramic layer 13 does not include any metals, a thermal coefficient C of the layer is greater than B. On the other hand, as the sealing member 4 and the impregnated ceramic phase 13 consist of similar materials, the thermal coefficient D is close to C.

As disclosed in Japanese Patent Application No. 178,415/1999, a thermal coefficient B' of main phase comprising impregnated glass phase is lower than a thermal coefficient B of main phase comprising impregnated ceramic phase. This is because the ceramic phase has higher thermal coefficient than glass phase. Correspondingly, a thermal coefficient C' of an intermediate glass phase is lower than a thermal coefficient C of an intermediate ceramic layer.

As a result, in the present invention, the difference between the thermal coefficient B of the main phase 14 and the thermal coefficient B' of the sealing member 4 becomes relatively large. However, it has been found that the enlargement of the difference does not affect a characteristic of resistance to thermal cycles. The reason is unapparent, but a metal constituting the sealing member 7 is joined with the matrix metal constituting the main phase 14, and thus a stress aroused from the thermal expansion difference between the main phase and the sealing member on the interface seems to be relaxed by a ductility and a tractility of said metal.

Simultaneously, in the present invention, a thermal coefficient C of the intermediate phase 13 is relatively close to a thermal coefficient D of the discharge tube 4. The stress relaxation along this interface, provided by the close thermal coefficients, is proved to be useful for improvement of the resistance to thermal cycles of the joined body.

The joined body in the present invention is particularly suitable to a high discharge lamp. In this case, such high pressure discharge lamp may be extremely stable to repeated cycles of activation and deactivation and a corrosive gas contained within the inner space of a ceramic discharge tube.

In the invention, preferably, the intermediate ceramic layer and the impregnated ceramic phase have substantially the same kind of composition. This means that both belong to the same ingredient system as a whole, thereby improving the strength of the joining portion. The intermediate ceramic layer and the impregnated ceramic phase further preferably have substantially the same composition. This means that the intermediate ceramic layer and the impregnated ceramic phase are derived from the same material.

The degree of crystallization of the intermediate ceramic layer and the impregnated ceramic phase is not limited, but may preferably be 80% or more. In such a case, the maximum degree is not limited, and may be 100%.

Each of the ceramic materials constituting the intermediate ceramic layer and the ceramic materials constituting the impregnated ceramic phase may preferably comprise one or more oxide selected from the group consisting of $Al_2O_3$, $Sc_2O_3$, $Y_2O_3$, $La_2O_3$, $Gd_2O_3$, $Dy_2O_3$, $H_2O_3$, $Tm_2O_3$, $SiO_2$, $MoO_2$ and $MoO_3$. A mixture of not less than three of the oxides may be particularly preferable.

To prevent corrosion caused by the corrosive gas contained within the high pressure discharge lamp over a long term, the composition of $SiO_2$ in each ceramic, which is a relatively corrosive ingredient, may preferably be 10 weight percent or less, and more preferably 5 weight percent or less.

$SiO_2$ also acts as a kind of binder to retain a shape of the ceramic material when this joined body is produced. Therefore, in view of improving the shape retaining character, $SiO_2$ may preferably be contained 5 ppm or more, and more preferably 20 ppm or more.

Each ceramic may preferably contain particularly $SiO_2$. In view of wettability, each ceramic may preferably contain a main component of the ceramic or cermet constituting the second member. The phrase "main component" herein means a ceramic component constituting 70 weight percent or more of the ceramic or a ceramic component constituting 60 weight percent or more of the cermet.

The following are the preferred composition ranges.
(1) $Al_2O_3$ 10 to 30 weight percent
   $Si_2O_2$ 10 weight percent or less (preferably 5 ppm or more)
   $Y_2O_3$ 0 to 40 weight percent
   $Dy_2O_3$ 0 to 70 weight percent
   $B_2O_3$ 0 to 5 weight percent
   $MoO_3$ 0 to 10 weight percent
(2) $Al_2O_3$ 10 to 40 weight percent
   $SiO_2$ 0 to 10 weight percent
   $Y_2O_3$ 10 to 25 weight percent
   $Dy_2O_3$ 10 to 40 weight percent
   $La_2O_3$ 10 to 40 weight percent The metal member may be made of one or more metal selected from the group consisting of molybdenum, tungsten, rhenium, niobium, tantalum and alloys thereof.

Among them, niobium and tantalum have thermal expansion coefficients matching with that of a ceramic, especially alumina ceramic, constituting a ceramic discharge tube. However, it is known that niobium and tantalum are susceptible to corrosion to a metal halide. Therefore, it is desirable to form a metal member by a metal selected from the group consisting of molybdenum, tungsten, rhenium and alloys thereof, for improving the life of the metal member. However, such metals, with high resistance to a metal halide, generally have a low thermal expansion coefficient. For example, alumina ceramic has a thermal expansion coefficient of $8 \times 10^{-6} K^{-1}$, molybdenum has that of $6 \times 10^{-6} K^{-1}$, and tungsten and rhenium have those of not more than $6 \times 10^{-6} K^{-1}$. In such a case, as described above, the inventive joined structure effectively reduces the stress due to the difference of the thermal expansion coefficients of the metal member and the ceramic discharge tube or the sealing member.

Molybdenum is suitably used for the invented structure in such advantages that it has high resistance to a metal vapor, particularly to a metal halide gas, and that it has high wettability to a ceramic.

When using molybdenum as a material of a metal member, at least one of $La_2O_3$ and $CeO_2$ may preferably be added to molybdenum in a ratio of 0.1 to 2.0 weight percent as a total.

A porous bone structure is made of a sintered product of metal powder. The metal powder may preferably be made of a metal selected from the group consisting of molybdenum, tungsten, rhenium, niobium, tantalum and the alloys thereof. For further improving the resistance of the structure to a halogen, a metal selected from the group consisting of molybdenum, tungsten, rhenium and the alloys thereof is particularly preferable.

The main components of the metals constituting the metal member and constituting the porous bone structure may preferably be the same and more preferably molybdenum. The phrase "main component" means that the component constitutes not lower than 60 weight percent of the metal.

The porous bone structure may preferably has a porosity, of open pores, of not lower than 30%, and more preferably not lower than 40%, thus improving the strength of the joining portion. The porosity may preferably be not higher than 80%, and more preferably be not higher than 70%, thus effectively impregnating the ceramic into the open pores of the bone structure and dispersing the stress applied on the structure to improve the resistance thereof to repeated thermal cycles.

The second member or sealing member is made of a ceramic or cermet. The ceramic may preferably be a ceramic alone, selected from the group consisting of alumina, magnesia, yttria, lanthania and zirconia, or the mixed compound thereof.

More particularly, the sealing member may be made of the same or the different kinds of material as that of the ceramic discharge tube. When the electric conductor is made of niobium or tantalum, the ceramic discharge tube and sealing member may preferably be made of the same kind of material, because in this case the thermal expansion coefficient of the electric conductor is approaching those of the ceramic discharge lamp and sealing member. The phrase "same kind of material" means that their base components of the ceramic materials are the same and the added component or components may be the same or different with each other.

When the metal member is made of molybdenum, tungsten, rhenium or the alloys thereof, the difference of the thermal expansion coefficients of the ceramic discharge tube and metal member are relatively increased. Therefore, it is preferable to adjust the thermal expansion coefficient of the sealing member between those of the electric conductor and the end portion of the ceramic discharge tube. For that reason, the sealing member may be formed of a cermet.

A cermet is a composite material of a ceramic and a metal. Such ceramic may preferably be a ceramic alone, selected from the group consisting of alumina, magnesia, yttria, lanthania and zirconia, or the mixed compound thereof, and more preferably be the same kind of ceramic as that of the ceramic discharge tube, thereby making it possible to co-fire the ceramic discharge tube and sealing member simultaneously. In view of this, the ceramic components of the ceramic discharge tube and the cermet may more preferably be alumina ceramic.

The metal component of the cermet may preferably be a metal, having a high temperature melting point and resistance to a metal halide, such as tungsten, molybdenum, rhenium or the like, or the alloys thereof, thus giving the sealing member improved resistance to the metal halide. The cermet may preferably has not lower than 55 weight percent, and more preferably not lower than 60 weight percent, of a ceramic component (the balance is a metal component).

The above-described joining method may be applied to both ends of a ceramic tube. However, in one end, it is necessary to apply a tubular-shaped metal member for introducing an ionizable light-emitting substance through the inner space of the metal member. In the other end, metal members with various shapes such as a rod, a tube or the like may be applied.

The shape of a ceramic discharge tube is not particularly limited, and includes a tube, a cylinder, a barrel or the like. When the metal member is a tubular shaped member supporting an electrode system, through which an ionizable light-emitting substance is introduced into the inner space of the discharge tube, the electrode-system-supporting member is sealed by laser welding or TIG welding. When using laser welding, for example, a Nd/YAG laser is used.

In the case of a metal halide high pressure discharge lamp, an inert gas, such as argon, a metal halide and optionally mercury is introduced into the inner space of the ceramic discharge tube.

FIGS. 1(a)–(b), 7 and 8 show the embodiments of the end portions of the lamp to which the invention is applied.

A joining portion 6 of the invention is interposed between a sealing member 4 and a metal member 7 to join them with each other and to secure air-tightness.

Figure 7:
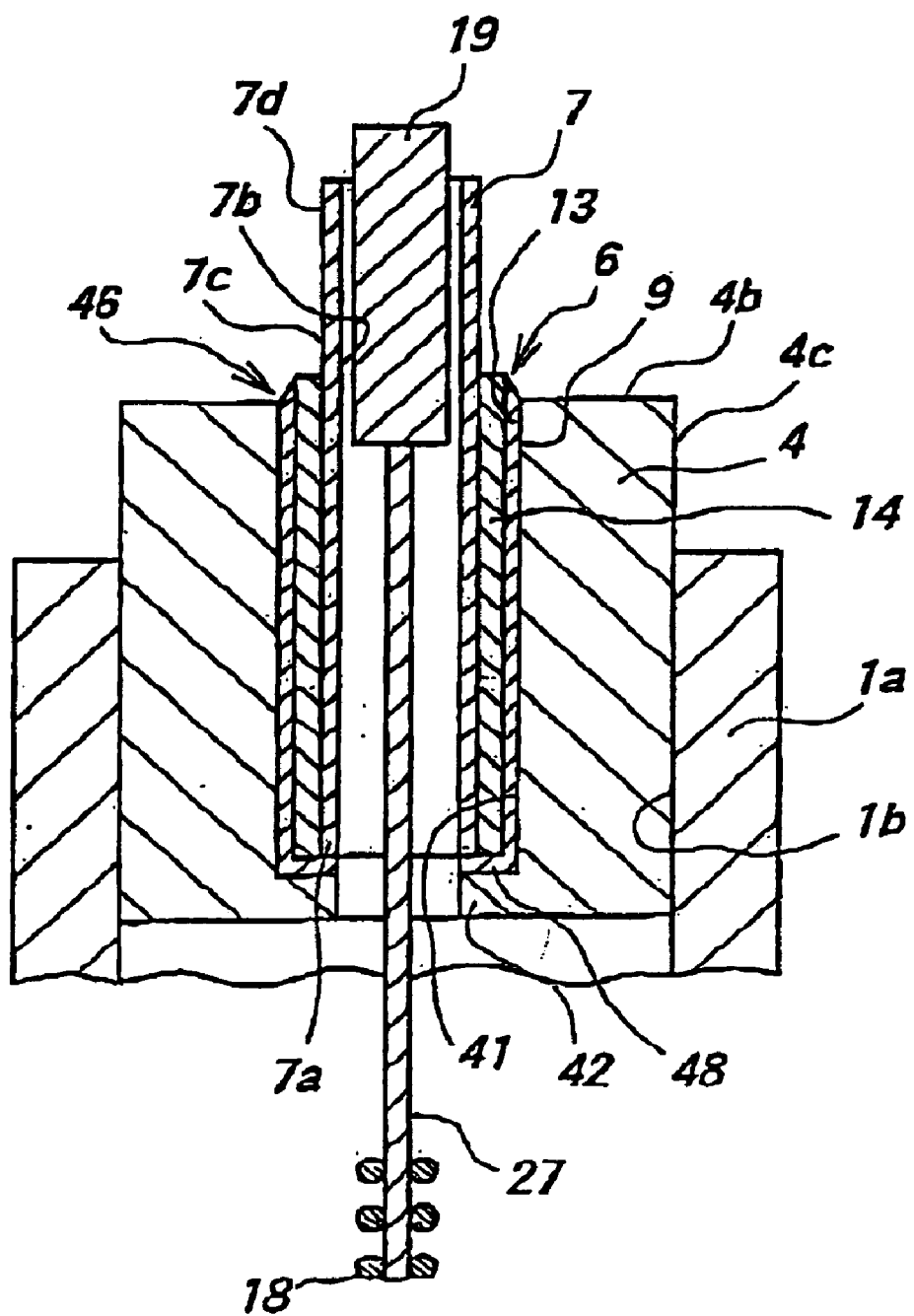
FIG. 7 is a cross sectional view showing the state wherein a clogging member 19 is inserted within the metal member 7 of the high pressure discharge lamp of FIGS. 1(a)–(b).
Figure 8:
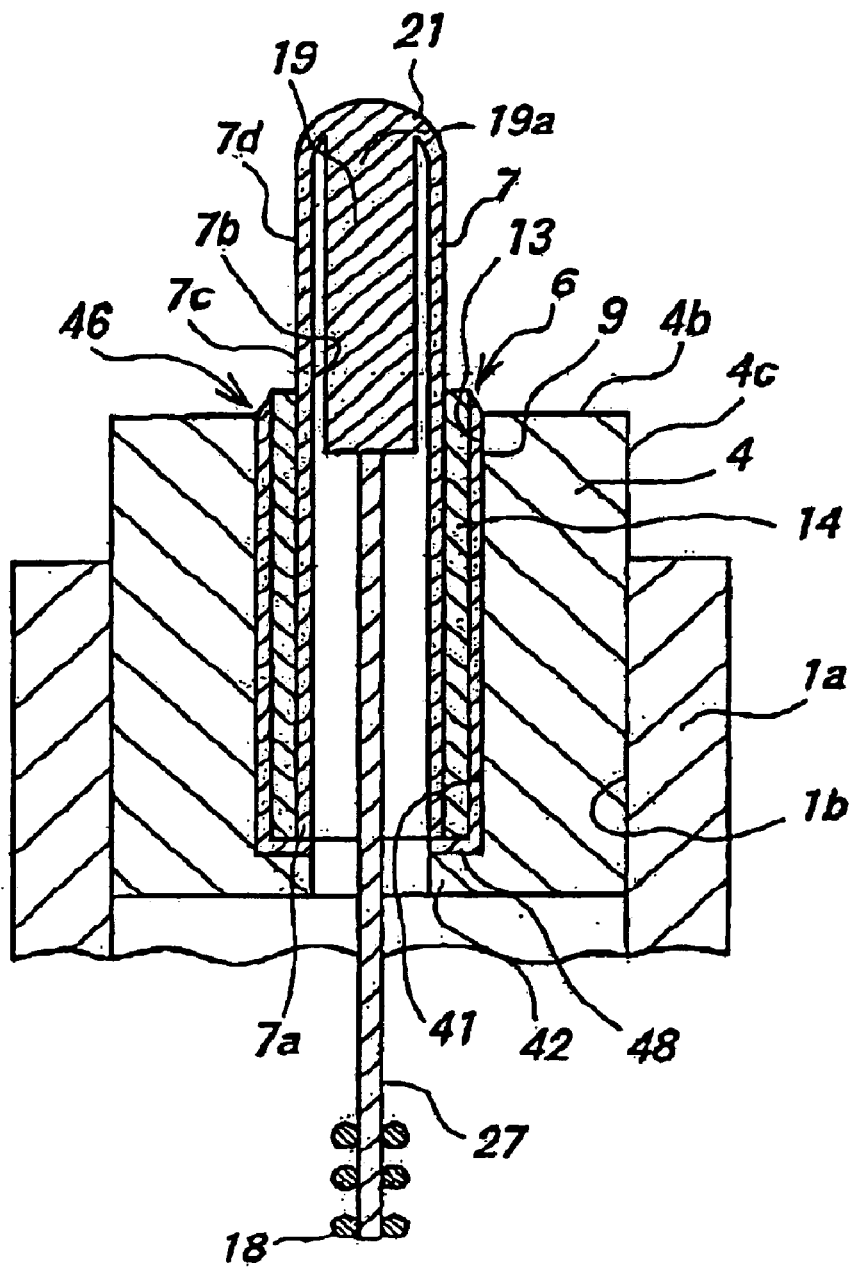
FIG. 8 is a cross sectional view showing a high pressure discharge lamp after the metal member 7 of FIG. 7 and a sealing member 19 is joined to form a sealing portion 21.

As shown in FIG. 7, an axis 27 of an electrode system 18 is attached to a clogging member 19 (preferably made of a metal), the electrode system 18 is inserted into the inner space of a ceramic discharge tube and the clogging member 19 is inserted into the inner space of the metal member 7. As shown in FIG. 8, an end portion 19a of the clogging member 19 is joined, by means of the above welding or the like, to the metal member 7 to form a sealing portion 21, thereby sealing an ionizable light-emitting substance and a starter gas in the inner space of the ceramic discharge tube from the outer atmosphere and providing an electric power to the electrode system 18 through the clogging member 19. A protrusion 42 functions to position the metal member 7 and to make flow path of the corrosive gas longer.

Figure 9:
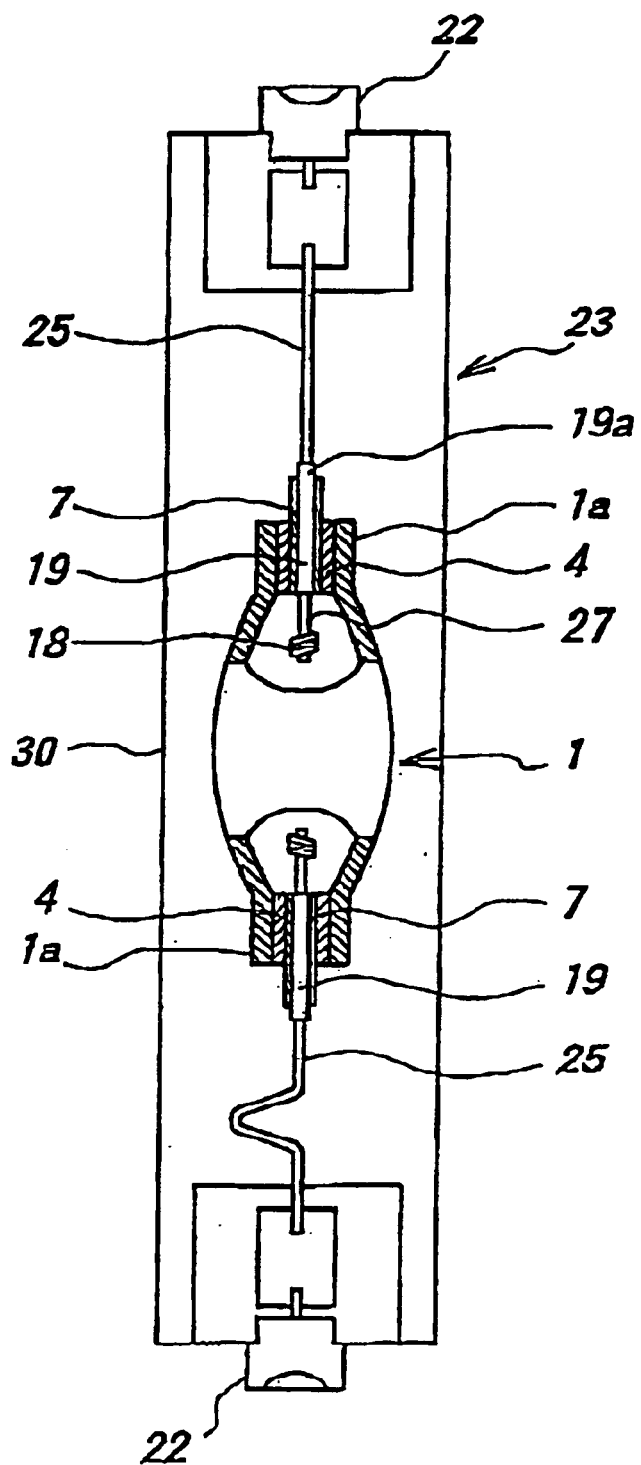
FIG. 9 is a diagram schematically showing an example of a high pressure discharge lamp.

FIG. 9 is a diagram schematically showing an embodiment of a high pressure discharge lamp. A high pressure discharge lamp system 23 has an outer tube 30 generally made of a hard glass, in which a high pressure discharge lamp 1 is contained. The outer tube 30 has both ends sealed with ceramic caps 22. Each clogging member 19 is inserted into and joined with each metal member 7. An outer lead wire 25 is connected with each outer end 19a of each clogging member 19.

Figure 10:
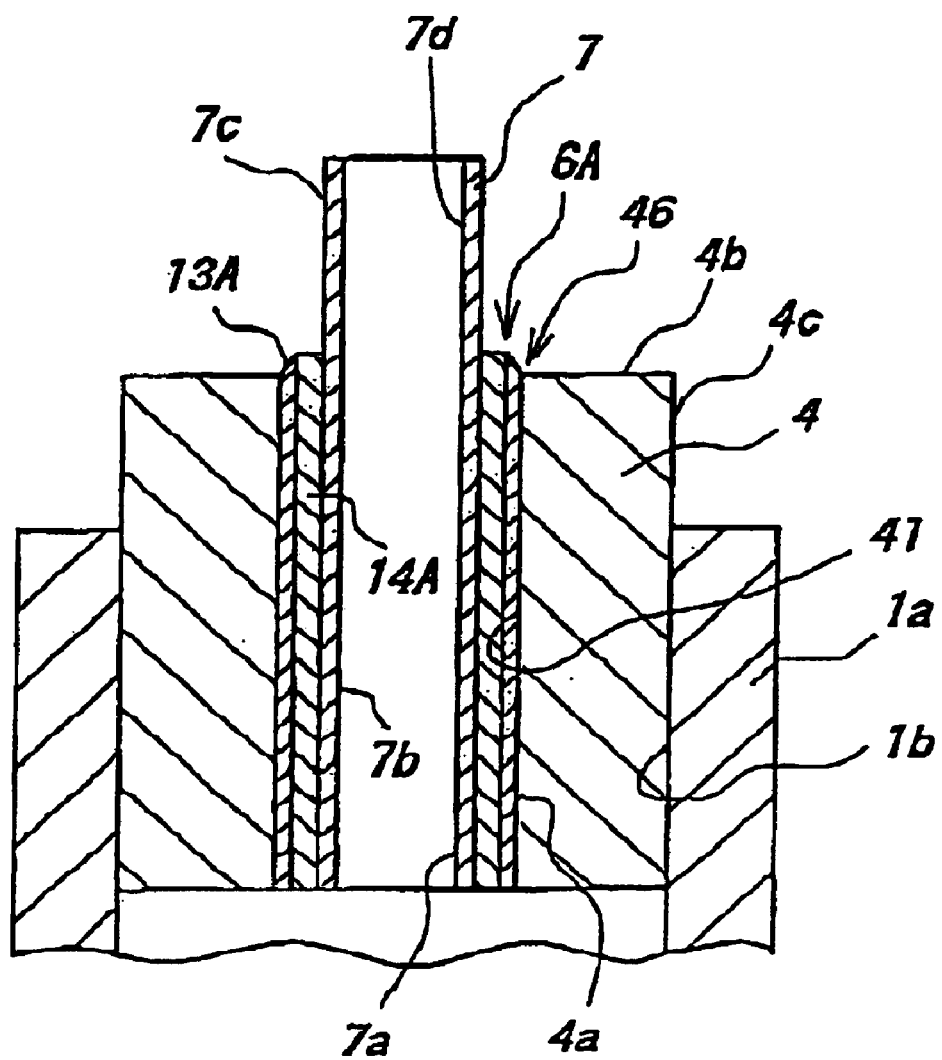
FIG. 10 is a cross sectional view schematically showing an embodiment of an end portion of a high pressure discharge lamp according to the invention, wherein a metal member 7 is joined to the inner wall surface of a sealing member 4 substantially along the full length of the wall.

In the embodiment shown in FIG. 10, the sealing member 4 has no protrusion on its inner wall surface. And, the metal member 7 and the inner wall surface of the sealing member 4 are joined substantially along the full length of the through hole 46 of the sealing member 4. 6A is a joining portion, 13A is an intermediate glass layer and 14A is the main phase.

Figure 11:
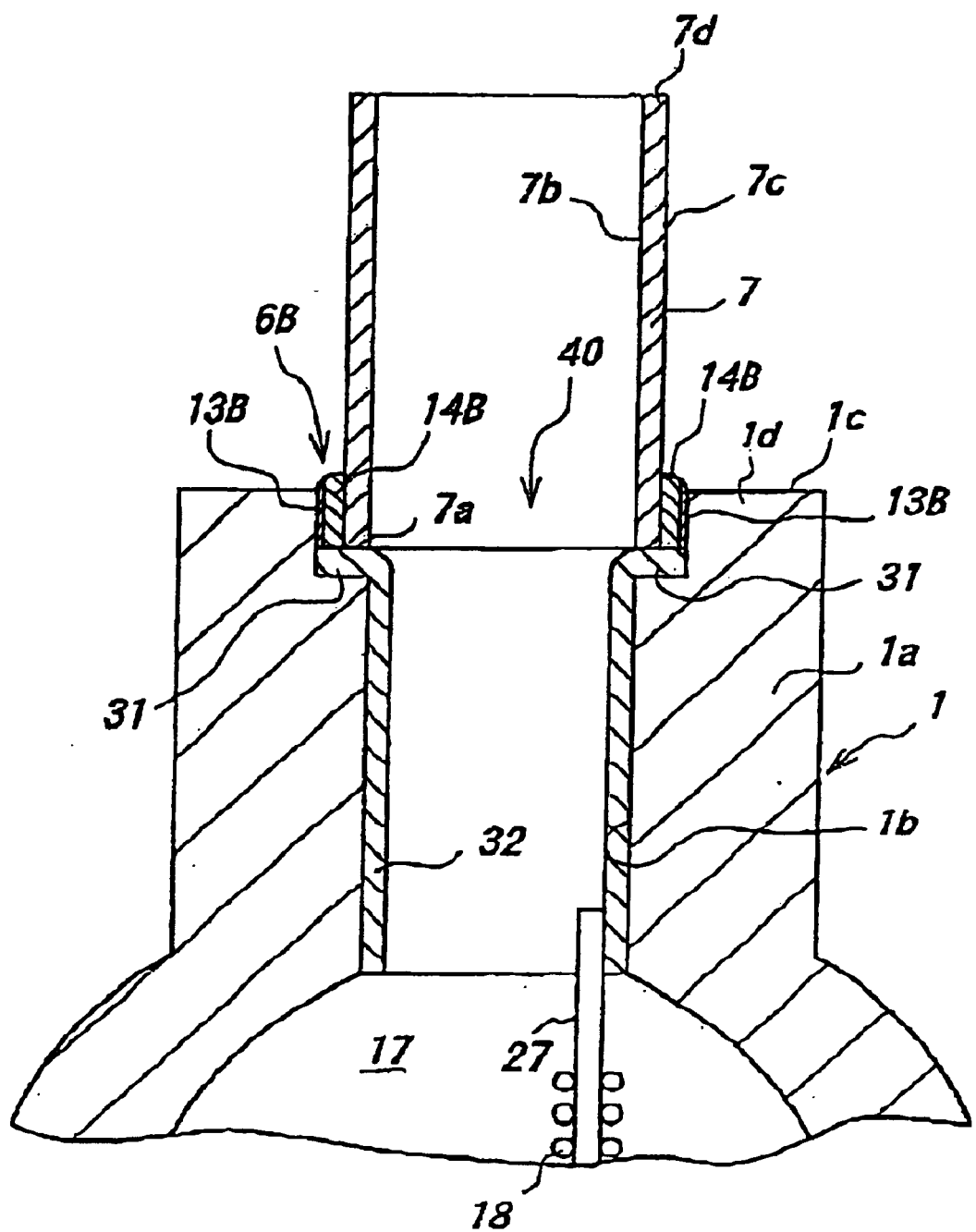

In the embodiment shown in FIG. 11, the inner wall surface 1b of the end portion 1a of the ceramic discharge tube 1 extends straightforwardly in the direction of the main axis of the ceramic discharge tube. A hollow 31 is formed in the end portion id of the inner wall surface 1b of the end portion 1a. An end portion 7a of a metal member 7 is supported in the hollow 31. A joining portion 6B is interposed between the discharge tube 1 and the metal member 7 and join them with each other in the hollow 31 to secure the air-tightness. 32 is a metallized layer.

Figure 12:
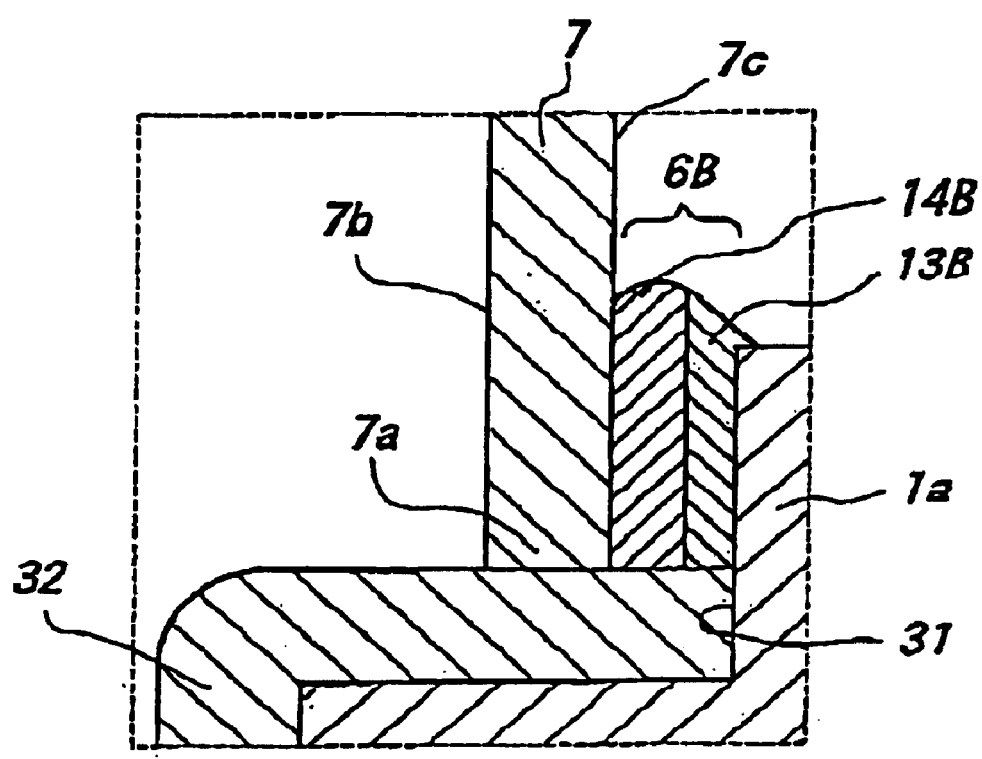
FIG. 12 is an enlarged view showing the region near a hollow 31 shown in FIG. 11.

FIG. 12 is an enlarged view of the region near the hollow 31 shown in FIG. 11. The joining portion 6B comprises the main phase 14B contacting the metal member 7 and an intermediate glass layer 13B contacting the discharge tube 1. The metallized layer 32 covers the inner wall surface 1b of the end portion 1a of the discharge tube 1, further covers the surface of the hollow 31, contacts the edge of the end portion 7a of the metal member 7 and extends to the edge of the joining portion 6B.

Figure 13:
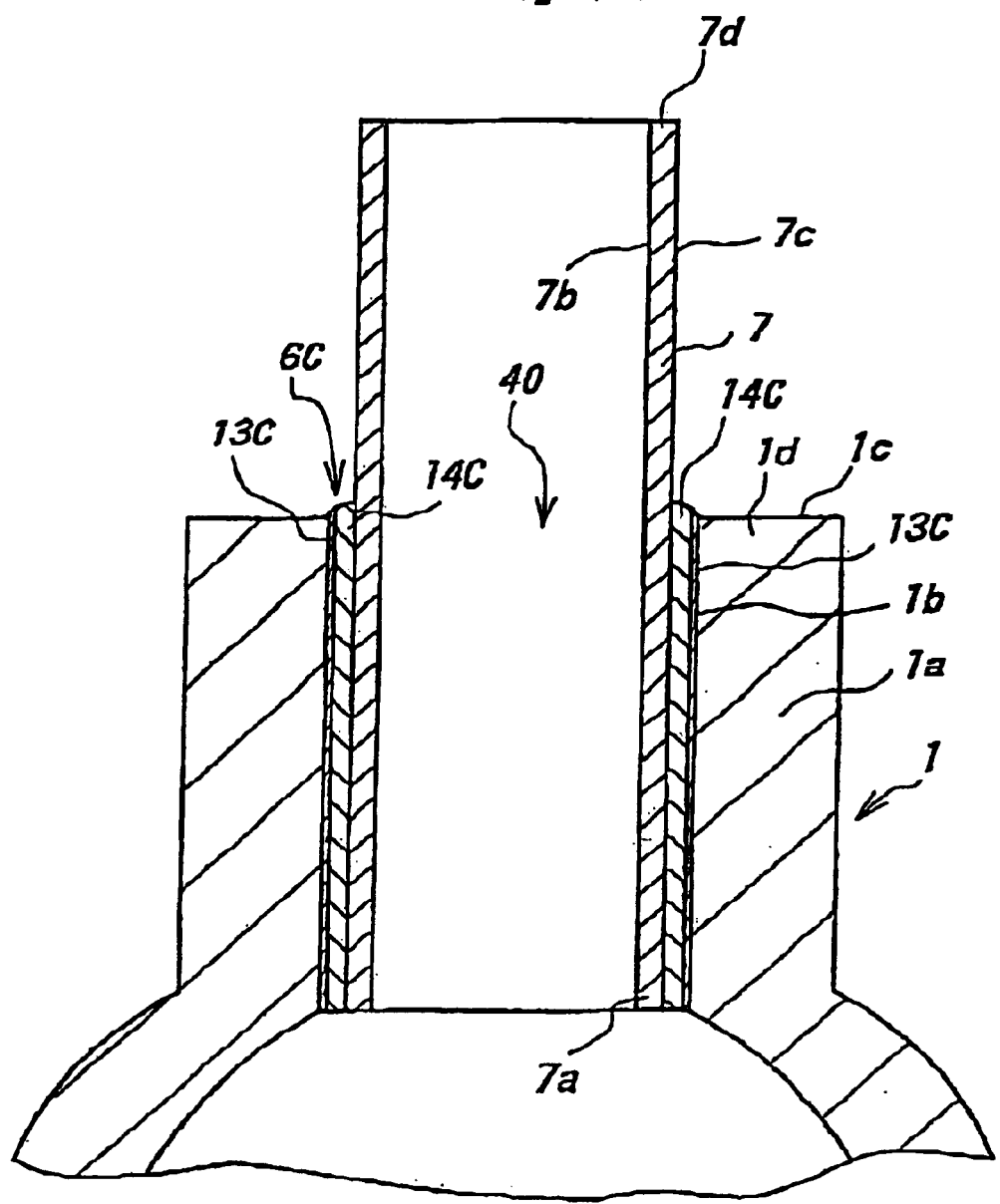
FIG. 13 is a cross sectional view schematically showing an end portion of a high pressure discharge lamp according to another embodiment of the invention, wherein a metal member 7 is joined to an inner wall surface of the end portion 1a of a discharge tube 1 substantially along the full length of the surface.

The embodiment of FIG. 13 have no protrusion on the inner wall surface 1b of the end portion 1a of the discharge tube 1 and the inner wall surface 1b extends substantially straightforwardly. The inner wall surface 1b of the end portion 1a and the metal member 7 are joined with each other substantially along the full length of an opening 40 of the end portion 1a. 6C is a joining portion, 13C is an intermediate ceramic layer and 14C is the main phase.

Figure 14:
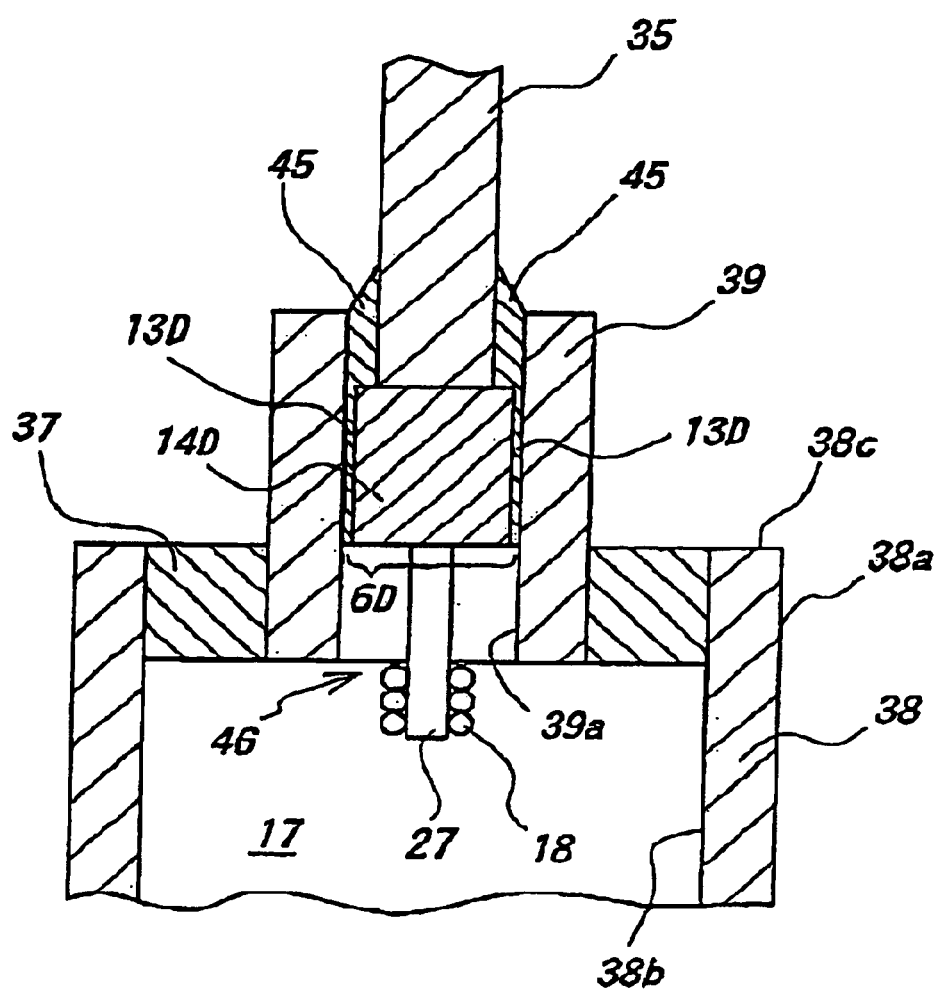
FIG. 14 is a cross sectional view schematically showing an end portion of a high pressure discharge lamp according to another embodiment of the invention, wherein a through hole 46 of a sealing member 39 is sealed by a joining portion 6D of the invention.
Figure 15:
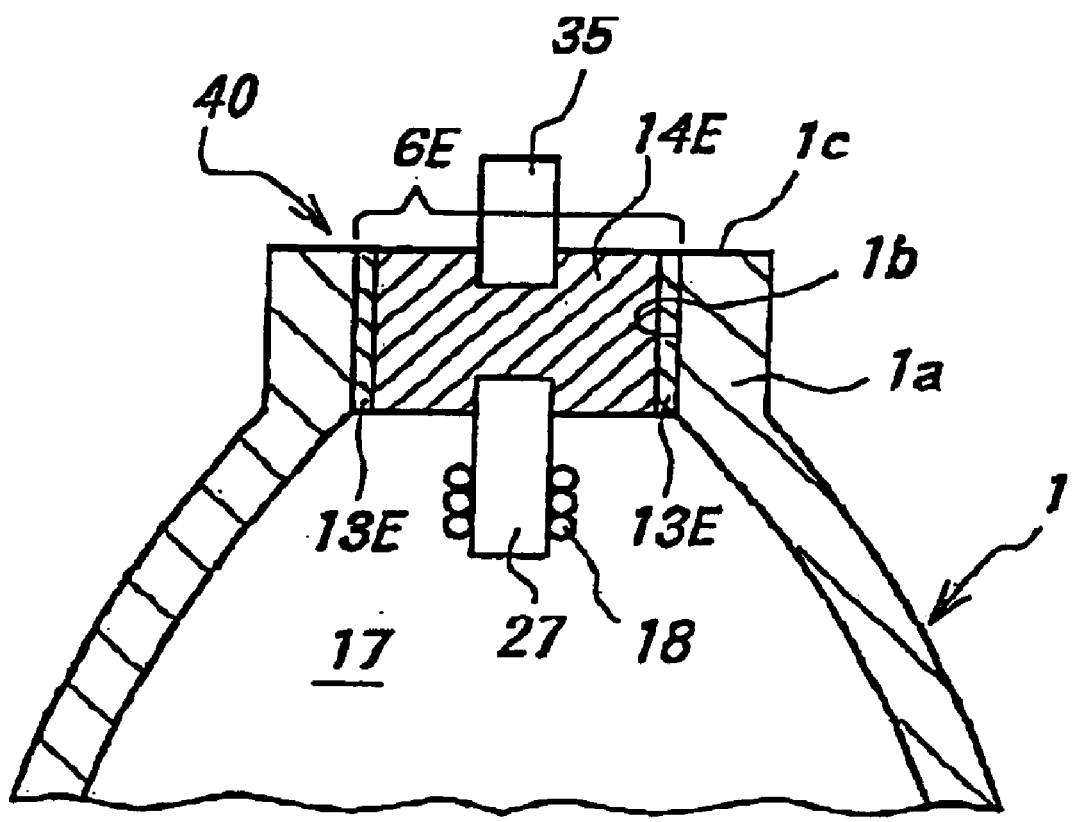
FIG. 15 is a cross sectional view schematically showing an end portion of a high pressure discharge lamp according to another embodiment of the invention, wherein an opening 40 of an end portion 1a of a discharge tube 1 is sealed by a joining portion 6E of the invention.

In each embodiment described above, the inventive joining portion is provided between the outer surface of the metal member and the inner wall surface of the end portion of the ceramic discharge tube or the sealing member. In other words, the above inventive joining portions do not seal the opening in the end portion of the ceramic discharge tube or through hole of the sealing member. However, the inventive joining portion has high resistance to corrosion and therefore may seal the opening of the ceramic discharge tube by itself, by contacting the intermediate ceramic layer with the inner wall surface, facing the opening, and by sealing it with the intermediate ceramic layer and the main phase with preserved air-tightness. Alternatively, the intermediate ceramic layer may be contacted with the inner wall surface, facing the through hole of the sealing member, to seal the through hole by this intermediate ceramic layer and the main phase with preserved air-tightness. In these cases, the metal member is joined to the main phase without passing through the joining portion. FIGS. 14 and 15 relate to such embodiments.

In the embodiment of FIG. 14, a first sealing member 37 is inserted within an inner surface 38b near an end face 38c of the ceramic discharge tube 38 of a high pressure discharge lamp. An outer surface 38a of the discharge tube 38 extends straightforwardly in its longitudinal direction. The thickness of the discharge tube 38 is substantially uniform. A second cylindrical sealing member 39 is inserted within the interior of the first sealing member 37. The sealing members 37 and 39 are made of a ceramic or cermet, same as the sealing members described above. The inventive joining portion 6D is formed within the second sealing member 39.

When forming the joining portion 6D, a porous bone structure 14 is inserted within the sealing member 39. Preferably, a metal member 35 and a metal axis 27, made of molybdenum, are joined to the bone structure 14 in advance. When the outer diameter of the porous bone structure and the inner diameter of the inner wall surface 39a of the sealing member 39 is strictly adjusted to the same value, it might be impossible to insert the bone structure due to the dimension clearance. Preferably, a clearance of 0.05 to 0.10 mm is provided. When inserting the porous bone structure and melting a ceramic material on the bone structure, the ceramic is impregnated into the porous bone structure to form the main phase 14D and an intermediate ceramic layer 13D is formed in the clearance of the bone structure 14 and sealing member 39.

Consequently, the through hole 46 of the sealing member 39 is substantially sealed by the main phase 14D and the intermediate ceramic layer 13D is formed within the clearance between the main phase 14D and the inner wall surface 39a of the sealing member 39. The axis 27 is joined onto the surface, facing the inner space 17, of the main phase 14D and a metal member 35 is joined to the outer surface of the main phase 14D. A ceramic layer 45 is further formed within the clearance between the metal member 35 and sealing member 39.

In the embodiment shown in FIG. 15, as shown in FIG. 14, the inventive joining portion 6E is formed within an opening 40 of the end portion 1a of the discharge tube 1.

When forming the joining portion 6E, a porous bone structure 14 is inserted into the inner opening 40 of the end portion 1a of the discharge tube 1. A metal member 35 and a metal axis 27 are joined to the bone structure in advance. A clearance, preferably of 0.05 to 0.10 mm, is provided between the outer surface of the bone structure and the inner surface 1b of the discharge tube 1. When inserting the porous bone structure and melting the ceramic material on the bone structure, the melted ceramic is impregnated into the porous bone structure to form main phase 14E and an intermediate glass layer 13E is formed in the clearance between the main phase 14E and the discharge tube 1.

Next, the most preferred process for producing high pressure discharge lamps according to embodiments of the invention will be described. When using a sealing member, powdery raw material (preferably alumina powder) of the sealing member is shaped into a shaped body, with a shape of a ring, of the sealing member. At this stage, it is preferred to press-mold granules, granulated with a spray drier or the like, under a pressure of 2000 to 3000 kgf/cm$^2$. The resulting shaped body may preferably be subjected to dewaxing and calcination to obtain a calcined body, which is then finish-sintered at a temperature between 1600 to 1900° C. under reducing atmosphere of a dew point of −15 to 15° C.

The dewaxing process may preferably be carried out at a temperature of 600 to 800° C. and the calcination process may preferably be carried out at a temperature of 1200 to 1400° C. under reducing atmosphere of hydrogen. The calcination may provide some degree of strength to the shaped body of the sealing member and facilitate the handling of the sealing member. A hollow may be formed, for example by machining.

Also, metal powder is formulated, crashed, dried, and milled with an added binder, such as ethyl cellulose, acrylic resin or the like, to obtain paste, which is then applied onto the outer surface of the end portion of the metal member and dried at a temperature of 20 to 60° C. The resulting calcined body is sintered under reducing or inert atmosphere or vacuum of a dew point of 20 to 50° C. at a temperature of 1200 to 1700° C.

Also, a main body of a ceramic discharge tube is shaped, dewaxed and calcined to obtain a calcined body of the ceramic discharge tube. A pre-sintered body of the sealing member is inserted into the end portion of the resulting calcined body, set at a predetermined position and finish-sintered under reducing atmosphere of a dew point of −15 to 15° C. at a temperature of 1600 to 1900° C. to obtain a ceramic discharge tube.

Also, powder or frit is pre-formulated to a predetermined ceramic composition, crashed, granulated with an added binder such as polyvinylalcohol or the like, press-molded and dewaxed to obtain molding material. Alternatively, powder or frit for a ceramic is melted and solidified to obtain solid, which is then crashed, granulated with added binder, press-molded and dewaxed. In this case, it is preferred to add 3 to 5 weight percent of a binder to the powder, to press-mold at a pressure of 1 to 5 ton, to dewax at about 700° C. and to calcine at a temperature of 1000 to 1200° C.

Such discharge tube, sealing member, metal member, porous bone structure and molding material are assembled as shown in FIG. 1(a) and heated to a temperature of 1000 to 1600° C. under non-oxidizing atmosphere.

The ceramic discharge lamp as described referring to FIGS. 1(a) to 6 was produced according to the above process. The ceramic discharge tube and sealing member was made of alumina ceramic, and a pipe made of molybdenum is used as the metal member. Molybdenum powder with an average particle diameter of 3 μm was used as the porous bone structure, and ethyl cellulose is used as a binder. The molybdenum powder had a tap density of 2.9 g/cc. The composition of the impregnated ceramic phase and the intermediate ceramic layer were dysprosium oxide 20 weight percent, lanthanum oxide 17 weight percent, alumina 35 weight percent, yttrium oxide 20 weight percent and silica 8 weight percent. In the resulting joined layer, crystallinity of the ceramic constituting thereof was 80 percent.

The ceramic discharge tube was subjected to a thermal cycle test. Particularly, in one cycle, its temperature is maintained at a room temperature for 15 minutes, increased to 1050° C., maintained at 1050° C. for 5 minutes and decreased to a room temperature. 1000 thermal cycles were performed. After that, helium leak test was performed to investigate the leakage of helium. The leak rate was lower than $10^{-10}$ atm·cc·sec.

850° C. is a temperature normally utilized and 1050° C. is an overloaded temperature. The resistance to the latter means that the discharge tube may safely preserve a starter gas and an ionizable light-emitting substance therein for a longer period of time, even when the gas and substance is introduced into the discharge tube under a pressure higher than a normal value.

Besides, FIGS. 2 and 3 are photomicrographs, taken by a scanning type electron microscope, showing the region near the interface between the inner surface of a metal member 7 and a sealing member 4 of this embodiment.

Also another high pressure discharge lamp was produced according to the above process. However, the composition of the ceramic was dysprosium oxide 20 weight percent, lanthanum oxide 20 weight percent, alumina 35 weight percent, yttrium oxide 21 weight percent and silica 4 weight percent. In the resulting joined layer, crystallinity of the ceramic constituting impregnated ceramic phase and the intermediate ceramic layer was 90 percent.

The ceramic discharge tube was subjected to a thermal cycle test. Particularly, in one cycle, its temperature is maintained at a room temperature for 15 minutes, increased to 1050° C., maintained at 1050° C. for 5 minutes and decreased to a room temperature. 1000 thermal cycles were performed. After that, helium leak test was performed to investigate the leakage of helium. The leak rate was lower than $10^{-10}$ atm·cc·sec.

When a sealing member is not applied in a high pressure discharge lamp, a main body of a ceramic discharge tube is shaped to obtain a shaped body, which is then dewaxed, calcined and finish-sintered. Also, paste of metal powder is produced as described above, applied or printed onto the surface of a metal member and subjected to heat treatment to form a porous bone structure. After the discharge tube and metal member are assembled and the above-described material is set, they are heat-treated as described above to obtain a high pressure discharge lamp.

The inventive joined body and joining method may be widely applied to, other than a high pressure discharge lamp, all the structural bodies, such as a switching device of vacuum, having a conductive portion or terminal whose air-tightness at a high temperature of about 900° C. is indispensable.

The present invention has been explained referring to the preferred embodiments, however, the present invention is not limited to the illustrated embodiments which are given by way of examples only, and may be carried out in various modes without departing from the scope of the invention.

What is claimed is:

1. A high pressure discharge lamp comprising:
   a ceramic discharge tube with an inner space formed therein and end portions, said inner space being filled with an ionizable light-emitting material and a starter gas and an opening being formed within said end portion;
   an electrode system provided within said inner space;
   a sealing member comprising a ceramic or a cermet with a through hole formed therein, at least a part of said sealing member being fixed within said opening of said ceramic discharge tube;
   a metal member; and
   a joining portion interposed between said metal member and said sealing member, said joining portion comprising a main phase contacting said metal member and an intermediate ceramic layer contacting said sealing member and existing between said sealing member and said main phase, said main phase comprising a porous bone structure with open pores and being made of a sintered product of powder of a metal, said main phase further comprising a ceramic phase impregnated into said open pores in said porous bone structure.

2. The lamp of claim 1, wherein said intermediate ceramic layer and said impregnated ceramic phase contain a main component of said ceramic or cermet constituting said sealing member.

3. The lamp of claim 1, wherein said metal constituting said porous bone structure contains a main component of said metal constituting said metal member.

4. The lamp of claim 1, wherein said intermediate ceramic layer and said impregnated ceramic phase are made of ceramic materials comprising the same ingredient system.

5. The lamp of claim 1, wherein each of said intermediate ceramic layer and said impregnated ceramic phase has a crystallinity of not lower than 80%.

6. The lamp of claim 1, wherein said metal member comprises one or more metal selected from the group consisting of molybdenum, tungsten, rhenium, niobium, tantalum and the alloys thereof.

7. The lamp of claim 6, wherein said metal member comprises one or more metal selected from the group consisting of molybdenum, tungsten, rhenium and the alloys thereof.

8. The lamp of claim 7, wherein said metal member comprises molybdenum or an alloy containing molybdenum.

9. The lamp of claim 1, wherein said sealing member comprises a ceramic selected from the group consisting of alumina, magnesia, yttria, lanthania and zirconia, or a cermet containing said ceramic.

10. The lamp of claim 9, wherein said sealing member comprises alumina or a cermet which contains alumina.

11. A high pressure discharge lamp comprising:
   a ceramic discharge tube with an inner space formed therein and end portions, said inner space being filled with an ionizable light-emitting material and a starter gas and an opening being formed within said end portion;
   an electrode system provided within said inner space;
   a sealing member comprising a ceramic or a cermet with a through hole formed therein, at least a part of said sealing member being fixed within said opening of said ceramic discharge tube;
   a metal member; and
   a joining portion interposed between said metal member and said sealing member, said joining portion comprising a main chase contacting said metal member and an intermediate ceramic layer contacting said sealing member and existing between said sealing member and said main phase, said main phase comprising a porous bone structure with open pores and being made of a sintered product of powder of a metal, said main phase further comprising a ceramic phase impregnated into said open pores in said porous bone structure, said porous bone structure having a porosity of open pores of not lower than 30% and not higher than 80%.

12. A high pressure discharge lamp comprising:
   a ceramic discharge tube with an inner space formed therein and end portions, said inner space being filled with an ionizable light-emitting material and a starter gas and an opening being formed within said end portion;
   an electrode system provided within said inner space;
   a sealing member comprising a ceramic or a cermet with a through hole formed therein, at least a part of said sealing member being fixed within said opening of said ceramic discharge tube;

a metal member; and a joining portion interposed between said metal member and said sealing member, said joining portion comprising a main phase contacting said metal member and an intermediate ceramic layer contacting said sealing member and existing between said sealing member and said main phase, said main phase comprising a porous bone structure with open pores and being made of a sintered product of powder of a metal, said main phase further comprising a ceramic phase impregnated into said open pores in said porous bone structure;

wherein each of a ceramic constituting said intermediate ceramic layer and a ceramic constituting said impregnated ceramic phase comprises one or more oxide selected from the group consisting of $Al_2O_3$, $Sc_2O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

13. The lamp of claim 12, wherein each of a ceramic constituting said intermediate ceramic layer and a ceramic constituting said impregnated ceramic phase comprises three or more oxides selected from the group consisting of $Al_2O_3$, $Sc_2O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

14. The lamp of claim 13, wherein each of a ceramic constituting said intermediate ceramic layer and a ceramic constituting said impregnated ceramic phase comprises $Dy_2O_3$, $La_2O_3$, $Al_2O_3$, $Y_2O_3$ and $SiO_2$.

15. The lamp of claim 13, wherein each ceramic baa a content of $SiO_2$ of not higher than 10 weight percent.

16. The lamp of claim 15, wherein each ceramic has a content of $SiO_2$ of not lower than 5 ppm.

17. A high pressure discharge lamp comprising:

a ceramic discharge tube with an inner space formed therein and end portions, said inner space being filled with an ionizable light-emitting material and a starter gas and an opening being formed within said end portion;

an electrode system provided within said inner space;

a metal member; and joining portion interposed between said metal member and said discharge tube, said joining portion comprising a main phase contacting said metal member and an intermediate ceramic layer contacting said discharge tube and existing between said discharge tube and said main phase, said main phase comprising a porous bone structure with open pores and being made of a sintered product of powder of a metal, said main phase further comprising a ceramic phase impregnated into said open pores in said porous bone structure.

18. The lamp of claim 17, wherein said intermediate ceramic layer and said impregnated ceramic phase contain a main component of said ceramic constituting said discharge tube.

19. The lamp of claim 17, wherein said metal constituting said porous bone structure contains a main component of said metal constituting said metal member.

20. The lamp of claim 17, wherein said intermediate ceramic layer and said impregnated ceramic phase are made of ceramic materials comprising the same ingredient system.

21. The lamp of claim 17, wherein each of said intermediate ceramic layer and said impregnated ceramic phase has a crystallinity of not lower than 80%.

22. The lamp of claim 17, wherein said metal member comprises one or more metal selected from the group consisting of molybdenum, tungsten, rhenium, niobium, tantalum and the alloys thereof.

23. The lamp of claim 22, wherein said metal member comprises one or more metal selected from the group consisting of molybdenum, tungsten, rhenium and the alloys thereof.

24. The lamp of claim 23, wherein said metal member comprises molybdenum or an alloy containing molybdenum.

25. The lamp of claim 17, wherein said discharge tube comprises a ceramic selected from the group consisting of alumina, magnesia, yttria, lanthania and zirconia.

26. The lamp of claim 17, wherein said discharge tube comprises alumina.

27. A high pressure discharge lamp comprising:

a ceramic discharge tube with an inner space formed therein and end portions, said inner space being filled with an ionizable light-emitting material and a starter gas and an opening being formed with said end portion;

an electrode system provided within said inner space;

a metal member; and a joining portion interposed between said metal member and said discharge tube, and said joining portion comprising a main phase contacting said metal member and an intermediate ceramic layer contacting said discharge tube and existing between said discharge tube and said main phase, said main phase comprising a porous bone structure with open pores and being made of a sintered product of powder of a metal, said main phase further comprising a ceramic phase impregnated into said open pores in said porous bone structure; and said porous bone structure having a porosity of open pores of not lower than 30% and not higher than 80%.

28. A high pressure discharge lamp comprising:

a ceramic discharge tube with an inner space formed therein and end portions, said inner space being filled with an ionizable light-emitting material and a starter gas and an opening being formed within said end portion;

an electrode system provided within said inner space;

a metal member; and a joining portion interposed between said metal member and said discharge tube, said joining portion comprising a main phase contacting said metal member and an intermediate ceramic-layer contacting said discharge tube and existing between said discharge tube and said main phase, said main phase comprising a porous bone structure with open pores and being made of a sintered product of powder of a metal, said rosin phase further comprising a ceramic phase impregnated into said open pores in said porous bone structure;

wherein each of a ceramic constituting said intermediate ceramic layer and a ceramic constituting said impregnated ceramic phase comprises one or more oxide selected from the group consisting of $Al_2O_3$, $Sc_9O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

29. The lamp of claim 28, wherein each of a ceramic constituting said intermediate ceramic layer and a ceramic constituting said impregnated ceramic phase comprises three or more oxides selected from the group consisting of $Al_2O_3$, $Sc_2O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

30. The lamp of claim 29, wherein each of a ceramic constituting said intermediate ceramic layer and a ceramic constituting said impregnated ceramic phase comprises $Dy_2O_3$, $La_2O_3$, $Al_2O_3$, $Y_2O_3$ and $SiO_2$.

31. The lamp of claim 29, wherein each ceramic has a content of $SiO_2$ of not higher than 10 weight percent.

32. The lamp of claim 31, wherein each ceramic has a content of $SiO_2$ of not lower than 5 ppm.

* * * * *

UNITED STATES PATENT AND TRADEMARK OFFICE
CERTIFICATE OF CORRECTION

PATENT NO. : 6,850,009 B2
DATED : February 1, 2005
INVENTOR(S) : Norikazu Niimi

It is certified that error appears in the above-identified patent and that said Letters Patent is hereby corrected as shown below:

Column 12,
Line 47, please change "chase" to -- phase --

Column 13,
Line 28, please change "baa" to -- has --
Line 40, please add -- a -- before "joining…"

Column 14,
Line 44, please change "rosin" to -- main --

Signed and Sealed this

Twenty-sixth Day of April, 2005

JON W. DUDAS
*Director of the United States Patent and Trademark Office*